Sept. 27, 1932.  L. VON REIS  1,879,720
METHOD AND DEVICE FOR CONVEYING GLASS PLATES AND OTHER ARTICLES
Filed May 28, 1928  2 Sheets-Sheet 1
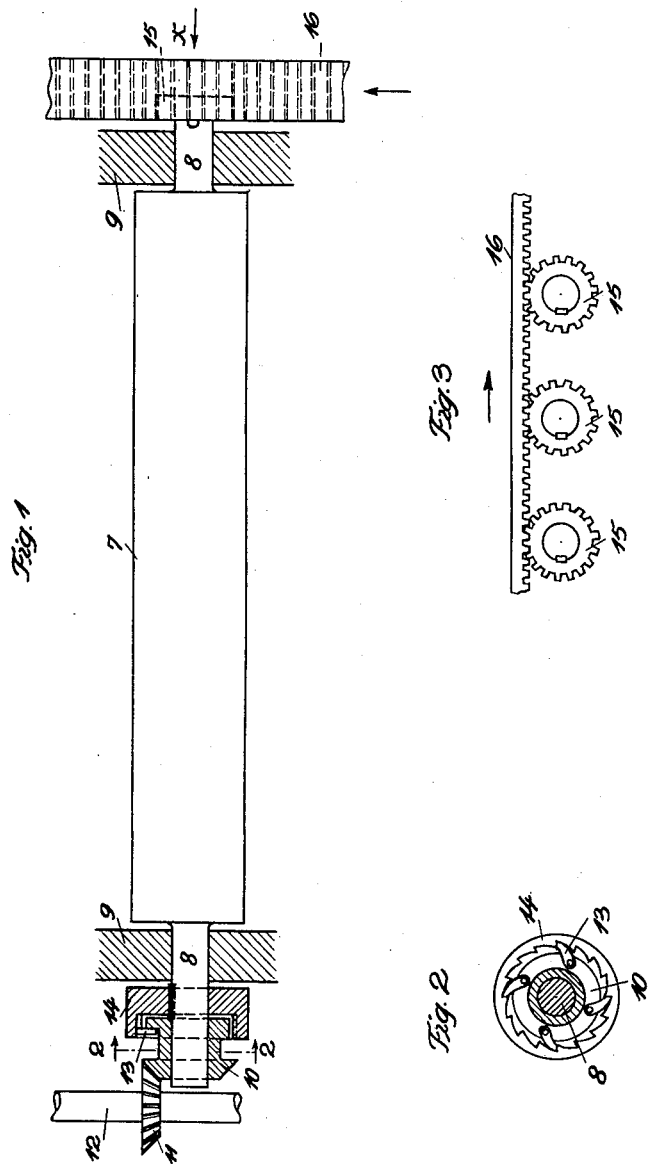

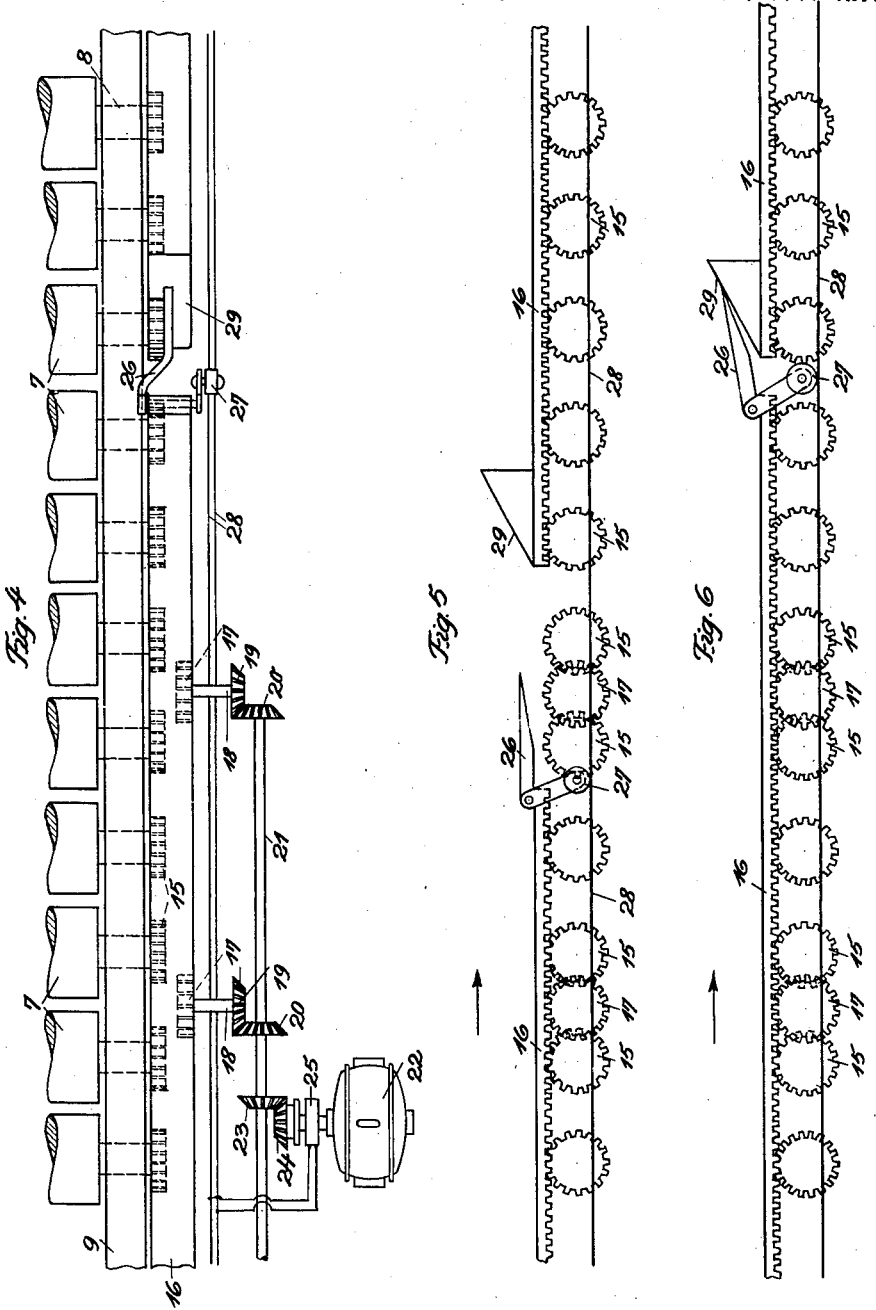

Patented Sept. 27, 1932

1,879,720

UNITED STATES PATENT OFFICE

LAMBERT von REIS, OF HERZOGENRATH, GERMANY, ASSIGNOR, BY MESNE ASSIGN-
MENTS, TO THE AMERICAN BICHERONY COMPANY, A CORPORATION OF DELAWARE

METHOD AND DEVICE FOR CONVEYING GLASS PLATES AND OTHER ARTICLES

Application filed May 28, 1928, Serial No. 281,291, and in Germany June 3, 1927.

This invention relates to the conveying of articles on a continuous path and has more particularly reference to roller conveyors such as are used for transporting glass plates from the place of formation to and through a leer for annealing the plates.

The invention has for its object to construct and operate a roller conveyor in such a manner that when used in the intermittent manufacture of glass plates it will be fully utilized throughout its entire length. To this end, it is necessary that the intermittently produced glass plates follow each other on the conveyor without any appreciable distance. In the rolling of glass plates from single pots, the rolling operation after emptying a pot and rolling out its contents is interrupted for returning the pot to the pot furnace and bringing up another full pot to the machine, while the conveyor continues its feeding motion for the purpose of securing a uniform cooling of the plates which it has already received from the rolling machine. Owing to this interruption of the rolling operation large distances are ordinarily produced between the several successive plates on the conveyor, which means that the conveyor is badly utilized.

This disadvantage is avoided according to the invention by causing the second and all further glass plates intermittently received by the conveyor to be carried ahead by the conveyor at a speed higher than the normal conveying speed until the second plate has moved up to the first and each following plate to the corresponding preceding plate, whereupon the respective plates are moved ahead at the normal speed of the conveyor.

An embodiment of the roller conveyor forming part of this invention is illustrated in the accompanying drawings.

Fig. 1 is a horizontal section through a portion of the conveyor illustrating one of the conveyor rollers and the two gearings for driving the same, Fig. 2 is a section on the line 2—2 of Fig. 1, Fig. 3 is a side view seen in the direction of the arrow $x$ of Fig. 1, Fig. 4 is a plan view of a portion of a roller conveyor with the gearing for driving the rollers at an increased speed, Fig. 5 is a side elevation of this gearing, and Fig. 6 is a similar side elevation with the parts in another position.

The conveyor consists of a continuous series of rollers 7 rotatably mounted by their shafts 8 in suitable side bars 9 or in the side walls of a leer. Each of the shafts 8 loosely carries at one of its ends a bevel wheel 10 which meshes with a bevel wheel 11 of a common driving shaft 12 which extends along one side of the conveyor. The bevel wheel 10 is provided with pawls 13 engaging the teeth of a ratchet wheel 14 which is rigidly fixed on the roller shaft 8. The pawls are operative in one direction only and serve to transmit the rotation of the shaft 12 to the rollers 7 of the conveyor for imparting to the same a low normal conveying speed.

The roller shafts 8 have splined on their other ends pinions 15, upon which rack bars 16 are adapted to be placed. These rack bars are designed to impart to the rollers 7 a speed higher than the normal conveying speed. The rack bars when in engagement with the pinions 15 are adapted to be moved in the direction of feed by pinions 17 mounted on stub-shafts 18 which carry bevel wheels 19 meshing with bevel wheels 20 of a shaft 21, Figs. 4–6. This shaft 21 extends along the side of the conveyor opposite to the side where the shaft 12 is arranged. The shaft 21 is connected with a separate motor 22 through a pair of bevel wheels 23, 24 and a releasable clutch 25. When the racks 16 are started the speed of the ratchet wheels 14 increases with relation to that of the pawls 13 which will then glide loosely on the toothed rim of the wheels 14.

Each rack bar 16 pivotally carries at its forward end an angular lever 26, one arm of which is provided with a contact roller 27 which is adapted to make and break the contact between two lines 28 of an electric circuit according to whether the lever is in the lowered position, Fig. 5, or in the raised position, Fig. 6. The circuit formed by the lines 28 serves to operate the clutch 25. When the circuit is closed the clutch is thrown in, while when the circuit is interrupted the clutch is released. Each rack bar 16 is provided at its rear end with a stop 29 having an inclined surface and adapted to cooperate with the lever 26 of another rack bar for swinging the same so that its trolley 27 is brought out of contact with the electric lines 28. When the left-hand rack 16 in Figs. 4–6 is moving ahead at an increased speed, while the right-hand rack 16 is moving at the normal conveying speed, the left-hand rack upon reaching the right-hand rack will enter by its lever 26 into engagement with the stop 29 of the right-hand rack. The upper arm of the lever 26 will ascend the inclined surface of the stop 29 and the lever will be swung so that the contact roller 27 is lifted out of contact with the electric lines 28 interrupting the flow of current through the same, Fig. 6. Thereby the clutch 25 between the motor 22 and the gearing 24, 23, 21, 19, 18, 17 is released, whereupon the rollers 7 will only be driven at the normal speed through the gearing 12, 11, 10, 13, 14, the rack bar being carried ahead at this speed by the pinions 15. In order to repeat the same operation for the next glass plate the foremost rack bar is removed and carried back to that point of the conveyor where same receives the next plate. At this point the rack bar is placed again on the pinions 15 and 17 and the lever 26 lowered with the contact roller 27 into engagement with the electric lines 28. The lever 26 is provided with suitable locking means (not shown) for holding it in its raised position.

The operation of the device is as follows: It is assumed that the conveyor is used for receiving and feeding glass plates intermittently made on a glass rolling machine from the contents of single pots. The conveyor is held to be provided with two separate rack bars 16 each of a length corresponding to the length of a glass plate rolled from the contents of one pot. During the rolling of the first plate one of the rack bars 16 is placed on the pinions 15 and 17 immediately behind the rolling machine. The contact roller 27 is placed into engagement with the electric lines 28 so that the glass plate will be fed toward and into the leer at an increased speed (rolling speed). When the plate has advanced for a certain distance, its increased speed is interrupted by raising the lever 26, which may either be done by hand or by a suitable stop arranged beside the conveyor. The plate will then continue its forward movement at the normal conveying speed (annealing speed). Instead of proceeding as described, a rack bar may be placed on the pinions 15 behind the rolling machine before the rolling operation is started. In this case the lever 26 is held in its raised position so that the rack bar will be moved forward with the normal conveying speed (annealing speed) preceding the first glass plate to be rolled. This preceding rack bar then forms the stop for the second rack bar which is placed on the pinions 15 during the rolling as stated above and carried ahead at rolling speed.

The increased speed (rolling speed) of the conveyor is attained by placing the roller 27 of the lever 26 into contact with the electric lines 28, thus closing the circuit which through the clutch 25 throws the motor 22 into operation which furnishes the power for driving the conveyor rollers at the desired increased speed. When the tail of a glass plate has emerged from the rolling machine the speed at which the plate is carried ahead may even be higher than the rolling speed, this being necessary in case the distance between the last plate and the next to last plate has become so long that an increased conveying speed corresponding to the rolling speed would not suffice to overcome such distance.

The distances between successive plates are caused by the continuous forward movement of the plates, on the one hand, and the pauses between the successive rolling operations, on the other hand.

When the next plate is being rolled, the second rack bar is placed on the pinions 15 at the rolling machine with the roller 27 in contact with the lines 28, so that this plate will travel ahead with the increased speed and approach the first plate which is at that time travelling with the normal conveying speed. When the second plate reaches the first, the upper arm of the lever 26 ascends the inclined surface of the stop 29 so that the roller 27 is moved into its raised position out of contact with the electric lines 28, so that the motor 22 is cut out. The second plate will then move forward with the same speed as the first plate, i. e. with the normal conveying speed (annealing speed). In order to feed the third plate in the same manner, the foremost rack bar 16 is removed from the pinions 15 and placed again on the same at the rolling machine, whereupon the described cycle begins again.

When manufacturing very long glass plates, it would be disadvantageous to use undivided rack bars because it would be difficult to handle such long racks. In this case it is preferable to make the rack bars, for instance, of two parts, a head part provided with the lever 26 and a tail part provided with the stop 29. In operation, the head part of such a rack is placed during the rolling on the pinions 15 along the side of the head of the rolled glass plate, i. e. the portion of the plate rolled out first, while the tail part of the rack bar is placed along the side of the tail of the glass plate, i. e. the portion of the plate rolled out last. The operation is the same as that described above. The two rack parts may be connected during the conveying by means of chains or the like. The racks may also be divided into more than two parts.

The rack and pinion gearing may be replaced by a chain and sprocket gearing.

The invention is also applicable in the inverse sense by imparting to some of the glass plates an increased speed for removing them from succeeding plates. This method may, for instance, be employed for conveying the glass plates when they have emerged from the leer and have to be subjected to further treatments.

While I have described the method and device only as applied to the conveying of glass plates, I wish it to be understood that the invention may be used in any case where articles intermittently delivered to a roller conveyor have to be fed from one place to another.

Having thus described my invention, what I claim as new and desire to secure by Letters Patent is:—

1. In a roller conveyor for conveying intermittently supplied articles, a driving shaft extending along one side of the conveyor, a toothed gearing between this shaft and each of the conveyor rollers for driving the rollers at a constant normal conveying speed, a ratchet and pawl mechanism interposed in the said gearing and adapted to put the same out of operation when the rollers are driven at a speed higher than the normal conveying speed, pinions on the conveyor rollers, pinions on separate stub-shafts arranged on one common level with the pinions of the rollers, a toothed gearing for driving the stub-shafts at a speed higher than the normal speed of the conveyor, rack bars adapted to be placed on and into engagement with the pinions of the rollers and the pinions of the stub-shafts so as to establish positive driving connection between the two sets of pinions and transmit the increased speed of the pinions of the stub-shafts to the conveyor rollers.

2. In a roller conveyor for conveying intermittently supplied articles, a toothed gearing for driving all rollers at a definite normal conveying speed, pinions on the rollers, pinions on separate stub-shafts, a toothed gearing independent from the first said gearing for driving the stub-shafts at a speed higher than the normal conveying speed, rack bars adapted to be placed on and into engagement with the two sets of pinions for transmitting the increased speed of the pinions of the stub-shafts to the rollers of the conveyor, a lever mounted for vertical swinging movement at the forward end of each rack bar, means carried by the said lever for throwing the gearing for the increased speed into operation when the lever is in a lowered position and for throwing this gearing out of operation when the lever is in a raised position, and a stop on the rear end of each rack bar adapted to swing the lever of a succeeding rack bar into its raised position upon this lever striking on the stop during the forward movement of the rack bars.

3. In a roller conveyor for conveying intermittently supplied articles, a toothed gearing for driving all rollers at a definite normal conveying speed, pinions on the rollers, pinions on separate stub-shafts, a toothed gearing independent from the first-said gearing for driving the stub-shafts at a speed higher than the normal conveying speed, rack bars adapted to be placed on and into engagement with the two sets of pinions for transmitting the increased speed of the pinions of the stub-shafts to the rollers of the conveyor.

4. In a roller conveyor for conveying intermittently supplied articles, a toothed gearing for driving all rollers at a definite normal conveying speed, pinions on the rollers, pinions on separate stub-shafts, a toothed gearing independent from the first-said gearing for driving the stub-shafts at a speed higher than the normal conveying speed, an electrically controlled clutch for throwing the last-said gearing into and out of operation, rack bars adapted to be placed on and into engagement with the two sets of pinions for transmitting the increased speed of the pinions of the stub-shafts to the rollers of the conveyor, a lever mounted for vertical swinging movement at the forward end of each rack bar, a contact roller carried by this lever and adapted to close the circuit for the said clutch when the lever is in a lowered position and to interrupt it when the lever is in a raised position, and a stop on the rear end of each rack bar adapted to cooperate with the lever of a succeeding rack bar for swinging the lever into its raised position upon this lever striking on the stop during the forward movement of the rack bars.

5. In a roller conveyor, means for driving all of the rollers at one speed, means for driving the rollers at a different speed, said means comprising pinions on the rollers, pinions on driven shafts, and a toothed member bridging said sets of pinions and travelling with the rollers of the conveyor.

6. In a roller conveyor, means for driving the rollers of said conveyor at one speed and means for driving said rollers at another speed, said means comprising pinions on the rollers, driven pinions on shafts and a toothed gearing in the form of a bar bridging the several sets of pinions and travelling with the rollers for which it forms part of the gearing.

In testimony whereof I have signed my name to this specification.

LAMBERT von REIS.

CERTIFICATE OF CORRECTION.

Patent No. 1,879,720. September 27, 1932.

LAMBERT von REIS.

It is hereby certified that the name of the assignee by mesne assignments in the above numbered patent was erroneously written and printed as "The American Bicherony Company" whereas said name should have been written and printed as "The American Bicheroux Company" as shown by the records of assignments in this office; and that the said Letters Patent should be read with this correction therein that the same may conform to the record of the case in the Patent Office.

Signed and sealed this 21st day of February, A. D. 1933.

(Seal)

M. J. Moore,
Acting Commissioner of Patents.